(12) United States Patent
Nesbitt

(10) Patent No.: US 11,572,294 B2
(45) Date of Patent: Feb. 7, 2023

(54) METHODS OF TREATING WATER TO REMOVE CONTAMINANTS AND WATER TREATMENT PLANTS FOR THE PRACTICE THEREOF

(71) Applicant: Reticle Inc., Los Altos Hills, CA (US)

(72) Inventor: Carl C. Nesbitt, Reno, NV (US)

(*) Notice: Subject to any disclaimer, the term of this patent is extended or adjusted under 35 U.S.C. 154(b) by 84 days.

(21) Appl. No.: 16/307,463

(22) PCT Filed: Nov. 8, 2018

(86) PCT No.: PCT/US2018/059899
§ 371 (c)(1),
(2) Date: Dec. 5, 2018

(87) PCT Pub. No.: WO2019/094645
PCT Pub. Date: May 16, 2019

(65) Prior Publication Data
US 2021/0230027 A1    Jul. 29, 2021

Related U.S. Application Data

(60) Provisional application No. 62/584,327, filed on Nov. 10, 2017.

(51) Int. Cl.
*C02F 1/52* (2006.01)
*C05C 5/02* (2006.01)
(Continued)

(52) U.S. Cl.
CPC ........... *C02F 1/5245* (2013.01); *C05C 5/02* (2013.01); *C05C 7/00* (2013.01); *C02F 2101/101* (2013.01); *C02F 2101/105* (2013.01); *C02F 2101/106* (2013.01); *C02F 2101/108* (2013.01); *C02F 2101/12* (2013.01);
(Continued)

(58) Field of Classification Search
CPC .................................................. C02F 1/5245
See application file for complete search history.

(56) References Cited

U.S. PATENT DOCUMENTS

| | | | | |
|---|---|---|---|---|
| 4,087,359 A | * | 5/1978 | Patron | C02F 1/66 423/101 |
| 5,128,047 A | * | 7/1992 | Stewart | C02F 9/00 210/724 |

(Continued)

OTHER PUBLICATIONS

European Patent Office, "Extended European Search Report EP3707102" dated Jun. 18, 2021, 10 pages.

(Continued)

*Primary Examiner* — Peter Keyworth
(74) *Attorney, Agent, or Firm* — William R. Childs; Childs Patent Law

(57) ABSTRACT

The present disclosure relates to methods of treating water to remove contaminants, including harmful metal ions, and water treatment plants for practicing such methods. In an embodiment, the process includes adding a sulfur-containing, metal-decreasing agent; an iron (III)-containing, metalloid-decreasing agent; forming a solid precipitate from the contaminated water, wherein the solid precipitate includes a solid metal sulfide, a solid iron metalloid, a solid calcium metalloid, or a combination thereof; and separating the contaminated water from the solid precipitate to form purified water.

10 Claims, 2 Drawing Sheets

(51) Int. Cl.
*C05C 7/00* (2006.01)
*C02F 101/10* (2006.01)
*C02F 101/12* (2006.01)
*C02F 101/20* (2006.01)

(52) U.S. Cl.
CPC ...... *C02F 2101/20* (2013.01); *C02F 2301/08* (2013.01); *C02F 2305/00* (2013.01)

(56) References Cited

U.S. PATENT DOCUMENTS

| | | | | |
|---|---|---|---|---|
| 6,153,108 | A * | 11/2000 | Klock | C02F 1/5236 210/722 |
| 6,217,768 | B1 * | 4/2001 | Hansen | C02F 3/12 210/622 |
| 2003/0070986 | A1 * | 4/2003 | Braun | C02F 9/00 210/620 |
| 2006/0060532 | A1 * | 3/2006 | Davis | C01D 3/06 210/652 |
| 2008/0135491 | A1 | 6/2008 | Cort | |
| 2010/0000924 | A1 | 1/2010 | Hayashi et al. | |
| 2012/0267315 | A1 * | 10/2012 | Soane | C02F 1/5236 210/714 |
| 2014/0124453 | A1 | 5/2014 | Presutti | |
| 2015/0083669 | A1 * | 3/2015 | Matherly | C02F 1/5236 210/723 |
| 2017/0050848 | A1 | 2/2017 | Lehmkuhl et al. | |

OTHER PUBLICATIONS

International Searching Authority/US, International Search Report and Written Opinion PCT/US2018/059899, dated Jan. 22, 2019, 23 pages.

Lalvani, Shashi B., "Selenium Removal From Agricultural Drainage Water: Lab Scale Studies" Final Report, dated Dec. 2004, 86 pages.

* cited by examiner

METHODS OF TREATING WATER TO REMOVE CONTAMINANTS AND WATER TREATMENT PLANTS FOR THE PRACTICE THEREOF

TECHNICAL FIELD

The present disclosure relates to methods of treating water to remove contaminants, including harmful metal ions, and water treatment plants for practicing such methods.

BACKGROUND

Clean water is essential for life. As earth's population increases to over 7.5 billion, the need for water to sustain human life, animal life, and agriculture increases. As industrialization increases, the demand for clean water increases, and the pollution of clean water sources usually increases too.

Many methods have been developed to purify water by removing debris, salts, bacteria, harmful metal ions, harmful organic compounds, and more. However, many of the methods of treating water are impractical for providing large amounts of clean water. For example, distillation has high energy requirements. Similarly, evaporation requires tying up large volumes for the duration of the evaporation process. Reverse osmosis typically provides very clean water, but is impractical for large volumes of water and may not remove all harmful metal ions.

For example, in San Francisco the water usage per person ranges from about 130 to 232 gallons per day, and the population of San Francisco is over 800,000. Also, agriculture consumes from about 30 to about 50% of the water used in California.

Also, many of the water purification techniques discussed above purify most of the water by concentrating all of the salts, metal ions, and metalloids into a concentrated brine. All desalination plants regardless of technology produce a concentrated brine that must be collected and remediated with the "reject" salts and solids properly disposed. Treating and disposing of concentrated brines is one of the most pressing needs in the water industry today.

There is a dire need for a method of treating water that can remove harmful contaminants, especially harmful metal ions and metalloids from water. There is a need for a method of treating water that can be scaled up to process hundreds of gallons of water per minute. There is a need for a method of treating water that has low energy requirements and uses inexpensive, readily available starting materials. There is a need for the remediation of brines generated from desalination processes.

SUMMARY

The present disclosure relates to a method of treating contaminated water. In an embodiment, the method or process for treating contaminated water includes adding at least one sulfur-containing, metal-decreasing agent to the contaminated water; adding at least one iron (III)-containing, metalloid-decreasing agent or at least one calcium-containing, metalloid-decreasing agent to the contaminated water; forming a solid precipitate from the contaminated water, wherein the solid precipitate includes a solid metal sulfide, a solid iron metalloid, a solid calcium metalloid, or a combination thereof and separating the contaminated water from the solid precipitate to form purified water. In an embodiment, the process further comprises or includes adding a hardness decreasing agent to the contaminated water, wherein the hardness decreasing agent includes a sulfate, a carbonate, or a combination thereof. In an embodiment, the process further includes adding a sulfate decreasing agent or a chloride decreasing agent to the contaminated water, wherein at least one of the sulfate decreasing agent and the chloride decreasing agent include a barium containing compound, a bismuth containing compound, or a combination thereof. In an embodiment, the step of adding at least one iron (III)-containing, metalloid-decreasing agent to the contaminated water occurs during or after the step of adding at least one sulfur-containing, metal-decreasing agent to the contaminated water. In an embodiment, at least one sulfur-containing, metal-decreasing agent includes $CH_4N_2S$, $C_2H_5NS$, NaHS, KHS, $H_2S$, or a combination thereof. In an embodiment, wherein, provided that the contaminated water contains a metal ion selected from the group consisting of cadmium, chromium, copper, lead, mercury, zinc, nickel, any metal ion that forms a solid sulfide precipitate, or a combination thereof, the solid metal sulfide is selected from the group consisting of a cadmium sulfide, a chromium sulfide, a copper sulfide, a lead sulfide, a mercury sulfide, a zinc sulfide, a nickel sulfide, any metal ion that forms a solid sulfide precipitate, or a combination thereof. In an embodiment, the iron (III)-containing, metalloid-decreasing agent includes $Fe_2(SO_4)_3$, $FeC_3$, ammonium iron(III) sulfate, or a combination thereof. In an embodiment, wherein, provided that the contaminated water contains a metalloid selected from the group consisting of an arsenate, a selenate, a borate, an antimonate, a phosphate, or a combination thereof, the solid iron metalloid is selected from the group consisting of an iron arsenate, an iron selenite, an iron borate, an iron antimonate, an iron phosphate, an iron hydroxide, or a combination thereof. In an embodiment, wherein the hardness decreasing agent includes, but is not limited to, $(NH_3)_2SO_4$, $(NH_3)_2CO_3$, $NH_3HCO_3$, $Na_2SO_4$, $Na_2CO_3$, $NaHCO_3$, any metal ion that forms a solid sulfide precipitate, or a combination thereof. In an embodiment, provided that the contaminated water contains magnesium, calcium, or a combination thereof, the solid contaminant includes $MgSO_4$, $MgCO_3$, $CaSO_4$, $CaCO_3$, or a combination thereof. In an embodiment, the sulfate/chloride decreasing agent contains $Ba(NO_3)_2$, $BaCl_2$, $Bi(NO_3)_3$, a bismuth oxynitrate ($BiO(NO_3)$), or a combination thereof. In an embodiment, provided that the contaminated water contains chloride, sulfate, or a combination thereof, the solid contaminant includes barium chloride, barium sulfate, bismuth oxychloride, bismuth sulfate, or a combination thereof. In an embodiment, the purified water contains a fertilizer selected from the group consisting of $NH_2CN$, $NaNO_3$, $KNO_3$, $NH_3NO_3$, or a combination thereof. In an embodiment, the process further includes a desalinization step. In an embodiment, one or both of the at least one sulfur-containing, metal-decreasing agent or the at least one iron (III)-containing, metalloid-decreasing agent is added as a solid. In an embodiment, the process further includes measuring a level of metal ion or metalloid in the contaminated water.

In an embodiment, provided that the contaminated water contains borates, adding a series of reagents which increase the oxidation state of the borates to be precipitated with addition of calcium salts. The oxidants include chemicals such as $H_2O_2$, $Na_2O_2$, $CaO_2$ or concentrated gaseous oxygen, and the calcium salts include $Ca(OH)_2$, $CaO$, $CaCl_2$). The boron-containing precipitate includes calcium metaborate and, calcium hydroborate. In some cases, this process may be performed after the other contaminants have been removed, as the procedure may solubilize some of the precipitated contaminants.

A water treatment plant for performing the processes or methods described in the preceding paragraph is disclosed. In an embodiment, a water treatment plant for performing a process is disclosed, wherein the process includes treating contaminated water by one or more steps which includes adding at least one sulfur-containing, metal-decreasing agent to the contaminated water; adding at least one iron (III)-containing, metalloid-decreasing agent or at least one calcium-containing, metalloid-decreasing agent to the contaminated water; forming a solid precipitate from the contaminated water, wherein the solid precipitate includes a solid metal sulfide, a solid iron metalloid, a solid calcium metalloid, or a combination thereof, and separating the contaminated water from the solid precipitate to form purified water. In an embodiment, the water treatment plant can be configured to perform the following steps, in order: adding at least one sulfur-containing, metal-decreasing agent to the contaminated water; adding at least one iron (III)-containing, metalloid-decreasing agent or adding at least one calcium-containing, metalloid-decreasing agent to the contaminated water; and adding a sulfate/chloride decreasing agent to the contaminated water, wherein the sulfate decreasing agent includes a barium containing compound, a bismuth containing compound, or a combination thereof, and wherein the purified water contains a fertilizer. In an embodiment, the water treatment plant includes a water inlet; a water outlet; and one or more reaction vessels, wherein at least one of the reaction vessels is connected to the water inlet and at least one of the reaction vessels is connected to the water outlet, wherein the water treatment plant is configured to add at least one sulfur-containing, metal-decreasing agent or the at least one iron (III)-containing, metalloid-decreasing agent to at least one of the reaction vessels. In an embodiment, the water treatment plant is further configured to add a hardness decreasing agent to the contaminated water, wherein the hardness decreasing agent includes a sulfate, a carbonate, or a combination thereof.

A process for treating contaminated water and producing water containing a fertilizer is disclosed. In an embodiment, the process includes adding one or both of at least one sulfur-containing, metal-decreasing agent or at least one iron (III)-containing, metalloid-decreasing agent to the contaminated water; forming a solid contaminant, wherein the solid contaminant includes a solid metal sulfide, a solid iron metalloid, or a combination thereof; and removing the contaminated water from the solid contaminant to form purified water, wherein the purified water contains a fertilizer. In an embodiment, the process further includes adding at least one sulfur-containing, metal-decreasing agent or at least one iron (III)-containing, metalloid-decreasing agent into one, two or more tanks individually, in sequence, or in a combination. In an embodiment, the process further includes transferring fluid from tank to tank, filtering after each tank. In an embodiment, the process further includes removal of a solid precipitate before, after, or during any reagent addition steps by filtering or settling. In an embodiment, the process further includes collecting the solid contaminants generated. In an embodiment, the process further includes concentrating or drying the solid precipitate before disposal.

A process for treating contaminated or ion-containing water is disclosed. In an embodiment, the process includes adding at least one sulfur-containing, metal-decreasing agent, at least one iron (III)-containing, metalloid-decreasing agent, a hardness decreasing agent, at least one sulfate reducing agent, and adding a sulfate decreasing agent, or any order or combination thereof, and removing ion-contaminants identified or quantified from contaminated water.

BRIEF DESCRIPTION OF THE DRAWINGS

The foregoing summary, as well as the following detailed description of the embodiments, will be better understood when read in conjunction with the attached drawings. For the purpose of illustration, there are shown in the drawings some embodiments, which may be preferable. It should be understood that the embodiments depicted are not limited to the precise details shown, and are not drawn to scale.

DETAILED DESCRIPTION

Figure 1:
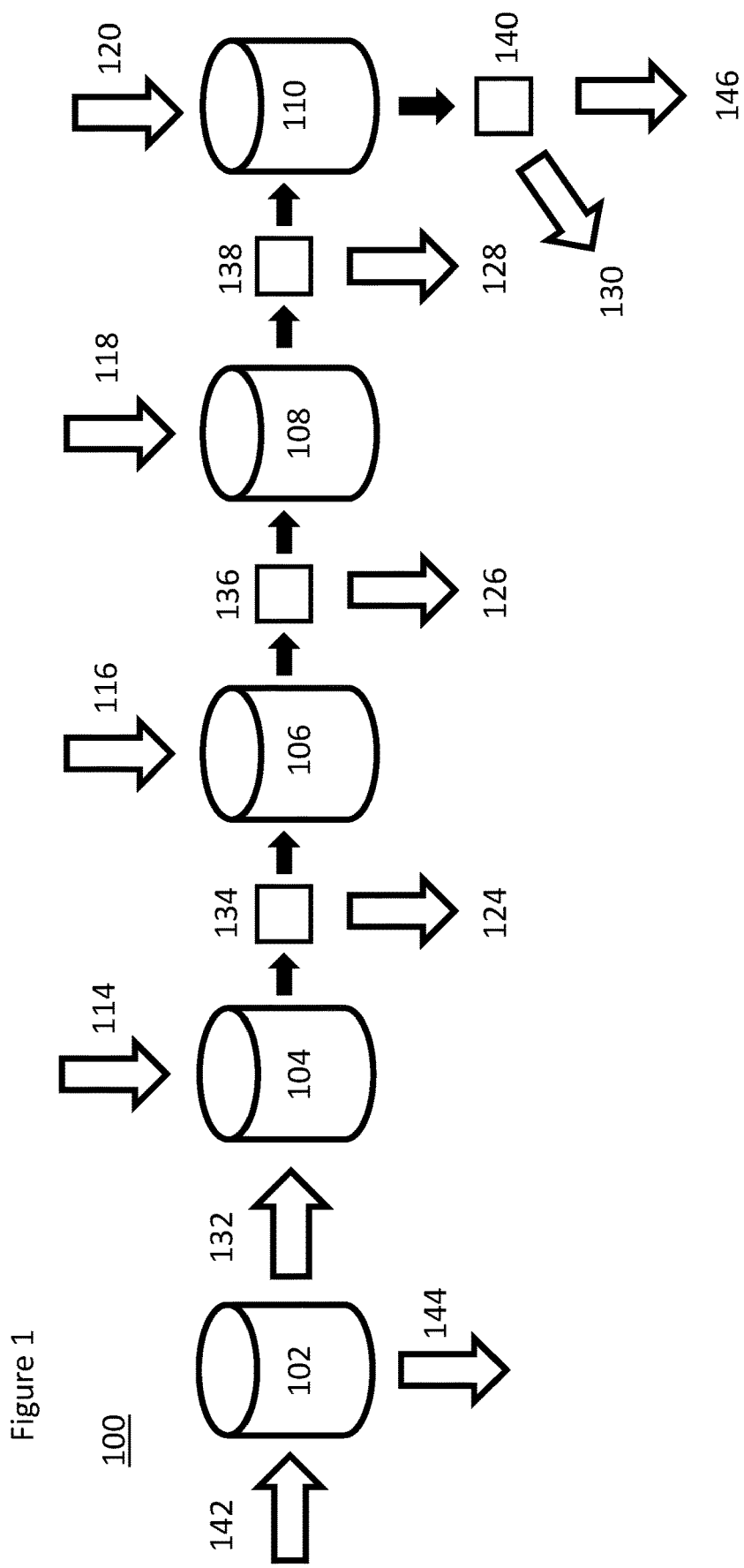
FIG. 1. An embodiment of the water treatment plant for performing an embodiment of the process is depicted in a flow chart.

Unless otherwise noted, all measurements are in standard American units, and standard metric units.

Unless otherwise noted, all instances of the words "a," "an," or "the" can refer to one or more than one of the word that they modify.

Unless otherwise noted, the phrase "at least one of" means one or more than one of an object. For example, "at least one of" four tanks means any one, two, three, or four tanks, or any combination thereof.

Unless otherwise noted, "contaminated water" means water that includes dissolved metal ions, metalloids, or a combination thereof. For example, the contaminated water can be a brine or brackish water that has been generated as a byproduct of a desalination process. Contaminated water can come from any source.

It is understood that metals can be present in contaminated water as a metal or a metal ion. However, metals are typically heavy solids that are easily filtered out. Therefore, unless otherwise noted, the term "metal" refers to a metal dissolved as a metal ion. For example, a "metal-reducing agent" refers to an agent capable of reducing the amount of metal ions present in the contaminated water. Similarly, the term "metal removal tank" refers to a vessel for removing metal ions.

A process for treating contaminated water is disclosed. In an embodiment, the method includes adding at least one sulfur-containing, metal-decreasing agent to the contaminated water. The at least one sulfur-containing, metal-decreasing agent is not generally limited so long as the at least one sulfur-containing, metal-decreasing agent is capable of decreasing the amount or concentration of metal ions in the contaminated water. In an embodiment, at least one sulfur-containing, metal-decreasing agent includes $CH_4N_2S$, $C_2H_5NS$, NaHS, KHS, $H_2S$, or a combination thereof. One benefit of the sulfur-containing, metal-decreasing agent can be that the addition of the sulfur-containing, metal-decreasing agent reduces the metal ions into metals that precipitate as a solid metal sulfide that can be easily filtered from the contaminated water. Another benefit of the sulfur-containing, metal-decreasing agent can be that the addition of the sulfur-containing, metal-decreasing agent reduces the positive charge on a metal ion to a lower charge, which facilitates the reduction and/or removal of the metal ions in later steps. In an embodiment, provided that the contaminated water contains a metal ion selected from the group consisting of cadmium, chromium, copper, lead, mercury, zinc, nickel, any metal ion that forms a solid sulfide precipitate, or a combination thereof, then the solid metal sulfide can be selected from the group consisting of a cadmium sulfide, a chromium sulfide, a copper sulfide, a lead sulfide, a mercury sulfide, a zinc sulfide, a nickel sulfide, any metal ion that forms a solid sulfide precipitate, or a combination thereof, respectively. One benefit of reducing or decreasing amounts or concentrations of cadmium, chromium, copper, lead, mercury, zinc, and nickel is that many of these metal ions are toxic or limited by regulation.

It is understood that adding at least one sulfur-containing, metal-decreasing agent to the contaminated water reduces or decreases the amount of metal ions on a stoichiometric basis. In an embodiment, the amount or concentration of metal ions is measured by techniques known in the art before or during the addition the sulfur-containing, metal-decreasing agent. For example, the sulfur-containing, metal-decreasing agent can be added during or after the amount or concentration of metal ions is quantified by mass spec, electrochemistry, disposable strips, and the like. One benefit of measuring the amount of metal ions present in the contaminated water can include saving costs by not adding excess sulfur-containing, metal-decreasing agent. One benefit of measuring the amount of metal ions present in the contaminated water can include avoiding the further contamination of the water with a sulfur-containing, metal-decreasing agent.

In an embodiment, the at least one sulfur-containing, metal-decreasing agent can be added as a dry solid or dissolved in or carried by a liquid. One benefit to adding at least one sulfur-containing, metal-decreasing agent as a dry solid can be that the solid form facilitates the precipitation of the metal sulfides formed. In an embodiment, the dry solid is added by a conveyor belt or other metering conveyor. One benefit to adding a metal-decreasing agent as a liquid can be the ability to easily spray the liquid across large areas of water.

In an embodiment, the method includes adding at least one iron (III)-containing, metalloid-decreasing agent or at least one calcium-containing, metalloid-decreasing agent to the contaminated water. The iron (III)-containing, metalloid-decreasing agent is not generally limited so long as the iron (III)-containing, metalloid-decreasing agent is capable of decreasing the amount or concentration of metalloids, such as an arsenate, a selenate/selenite, a borate, and/or a phosphate, many of which are toxic or limited by regulation. In an embodiment, the at least one iron (III)-containing, metalloid-decreasing agent includes $Fe_2(SO_4)_3$, $FeCl_3$, ammonium iron(III) sulfate, or a combination thereof. One benefit of adding the iron (III)-containing, metalloid-decreasing agent can be the formation or precipitation of solid iron containing salts, which can be easily filtered from the contaminated water. Another benefit of adding at least one iron (III)-containing, metalloid-decreasing agent during or after at least one sulfur-containing, metal-decreasing agent can be further decreasing the amount or concentration of metal ions that were not completely reduced to metal sulfide or precipitated by only the addition of the sulfur-containing, metal-decreasing agent. In an embodiment, provided that the contaminated water contains a metalloid selected from the group consisting of an arsenate, a selenate/selenite, a borate, a phosphate, or a combination thereof, then the solid iron metalloid formed would be an iron arsenate, an iron selenate or iron selenite, an iron borate, an iron phosphate, an iron hydroxide, or a combination thereof, respectively.

It is understood that adding at least one iron (III)-containing, metalloid-decreasing agent or at least one calcium-containing, metalloid-decreasing agent to the contaminated water reduces or decreases the amount of metalloid compounds or metal ions on a stoichiometric basis. In an embodiment, the amount or concentration of metalloids can be measured by techniques known in the art before or during the addition the iron (III)-containing, metalloid-decreasing agent or the calcium-containing, metalloid-decreasing agent. For example, the addition of the iron (III)-containing, metalloid-decreasing agent or calcium-containing, metalloid-decreasing agent can be added during or after the amount or concentration of metalloids is quantified by mass spectroscopy, electrochemistry, disposable strips, and the like. One benefit of measuring the amount of metalloids present in the contaminated water can be avoiding the addition of excess iron (III)-containing, metalloid-decreasing agent or at least one calcium-containing, metalloid-decreasing agent, which can save on the costs of these materials. One benefit of measuring the amount of metalloids present in the contaminated water can be avoiding further contamination of the water with excess iron (III)-containing, metalloid-decreasing agent or calcium-containing, metalloid-decreasing agent.

In an embodiment, at least one iron (III)-containing, metalloid-decreasing agent or at least one calcium-containing, metalloid-decreasing agent can be added as a dry solid or dissolved in a liquid. One benefit to adding at least one iron (III)-containing, metalloid-decreasing agent or at least one calcium-containing, metalloid-decreasing agent as a dry solid can be that the solid form facilitates the precipitation of the iron (III) or calcium metalloid formed. In an embodiment, the dry solid is added by a convey belt. One benefit to adding at least one iron (III)-containing, metalloid-decreasing agent or at least one calcium-containing, metalloid-decreasing agent as a liquid can be the ability to easily spray the liquid across large areas of contaminated water.

In an embodiment, the process disclosed herein includes treating contaminated water by adding at least one sulfur-containing, metal-decreasing agent to the contaminated water, and adding at least one iron (III)-containing, metalloid-decreasing agent, or at least one calcium-containing, metalloid-decreasing agent to the contaminated water. While these steps separately may have been performed to purify water in the past, it has been found that the combination of these steps provides a benefit of removing all or substantially all toxic metal ions and metalloids from the contaminated water. Further, this combination can treat vast volumes of contaminated water without high energy requirements because the toxic contaminants are precipitated out of solution as solids that can be easily separated from the water by high volume techniques such as filtration, decantation, settling, and the like, yielding water with reduced harmful contaminants. One reason that no one appears to have combined these steps before is that it could be seen as the addition of one set of contaminates to remove another set of contaminates. However, one benefit of the present method can be that both steps add stoichiometric amounts of sulfur-containing, metal-decreasing agent and iron (III)-containing, metalloid-decreasing agent, and/or at least one calcium-containing, metalloid-decreasing agent such that these additives reduce, decrease, or eliminate toxic contaminates present in the contaminated water. Also, if there is a slight excess of these additives in the water they can be removed by later steps. If there is a slight excess of these additives in the water these additives would likely be less toxic than the metal ions and metalloids removed. For example, any residual sulfate would be expected to be less toxic for many uses than arsenate or cadmium ions.

In an embodiment, the process disclosed above can further include adding a hardness decreasing agent to the contaminated water, wherein the hardness decreasing agent includes a sulfate, a carbonate, or a combination thereof. In an embodiment, the hardness decreasing agent includes $(NH_3)_2SO_4$, $(NH_3)_2CO_3$, $NH_3HCO_3$, $Na_2SO_4$, $Na_2CO_3$, $NaHCO_3$, any metal carbonate or sulfate that forms a metal sulfide precipitate, or a combination thereof. In an embodiment, provided that the contaminated water contains magnesium, calcium, or a combination thereof, then a solid precipitate or solid contaminate will be formed which includes $MgSO_4$, $MgCO_3$, $CaSO_4$, $CaCO_3$, or a combination thereof.

In an embodiment, the step of adding a hardness decreasing agent to the contaminated water is optional, because the removal of calcium ions and magnesium ions is not important for many applications of water. However, one benefit of removing calcium ions and magnesium ions can be preventing or decreasing the occurrence of unintentional mineral deposits, such as calcium deposits, which can clog pipes, sprayers, and other water tools. In an embodiment, the step of adding a hardness decreasing agent to the contaminated water provides a benefit of removing sulfate ions added in, for example, the metalloid decreasing step. In this embodiment, there is a sort of ion exchange that can be thought of as replacing calcium ions, magnesium ions, carbonates, and/or sulfates with ammonium ions, sodium ions, and nitrate ions.

It has been found that one of the challenges of adding chemicals to remove chemicals is that it can be difficult to remove all chemicals because they do not completely remove each other. Therefore, in an embodiment of the process, there is a synergy among the steps where the addition of ammonium ions, sodium ions, and nitrate ions to remove more other chemicals results in purified water containing an amount of $NH_2CN$, $NaNO_3$, $KNO_3$, $NH_3NO_3$, and combinations thereof, which are known to be safe fertilizers. For many uses, such as agriculture, people pay to add these fertilizers to clean water before spraying the water onto fields. In an embodiment, the present method generates purified water that contains a fertilizer, including $NH_2CN$, $NaNO_3$, $KNO_3$, $NH_3NO_3$, and combinations thereof, as a valuable byproduct.

In an embodiment, the process includes a step of adding a sulfate decreasing agent or a chloride decreasing agent to the contaminated water. In an embodiment, this step is optional because some embodiments add a hardness reducing agent, which also removes sulfate. In an embodiment, this step is optional because low levels of chloride are generally safe in water for human consumption and agricultural use. In an embodiment, one benefit to removing chloride from water can be the prevention or reduction of corrosion in pipes. In an embodiment, the sulfate decreasing agent and/or the chloride decreasing agent include a barium containing compound, a bismuth containing compound, or a combination thereof. Suitable sulfate decreasing agents or chloride decreasing agents include $Ba(NO_3)_2$, $BaCl_2$, $Bi(NO_3)_3$, a bismuth oxynitrate, or a combination thereof. In an embodiment, provided that the contaminated water contains chloride, sulfate, or a combination thereof, then a solid precipitate or solid contaminant can be formed that includes barium chloride, barium sulfate, bismuth oxychloride, bismuth sulfate, or a combination thereof. In an embodiment of the process, the solid precipitate can be removed from the contaminated water during or after the addition of a sulfate decreasing agent or a chloride decreasing agent to the contaminated water. In an embodiment, the solid precipitate can be removed by any method of removing a liquid from a solid including filtering, settlement, and the like.

In an embodiment, the process includes measuring or quantifying a level of metalloid, metal ion, or other contaminant in the water before, during, or after any step of the process, including any addition step. One benefit of performing a measuring or quantifying step before or during an addition step can be determining how much reactant to add during the addition step. One benefit to performing a measuring or quantifying step during or after each step can be to ensure that no contaminants accidently slip through the process. In an embodiment, the contaminated water or purified water from any step of the process can be recycled to any other step of the process for further processing.

In an embodiment, the process includes a further step of desalination before any other step. In an embodiment, the process does not include desalination, and the process can be performed on a brine water obtained from a desalination process. One benefit to treating brine water from any source is that contaminates are more concentrated, which leads to more efficient treatment or remediation of the contaminated water per volume processed. In an embodiment, any of the solid precipitate generated by the process or water treatment plant can be collected, dried, concentrated, or otherwise processed to recover valuable materials or make the precipitate safer for proper disposal.

In an embodiment, a process includes a step of measuring an amount of metal ions in the contaminated water, measuring the absence or substantial absence of metal ions, and excluding the addition of at least one sulfur-containing, metal-decreasing agent to the contaminated water such that the process further includes adding at least one iron (III)-containing, metalloid-decreasing agent or at least one calcium-containing, metalloid-decreasing agent to the contaminated water; forming a solid precipitate from the contaminated water, wherein the solid precipitate includes a solid metal sulfide, a solid iron metalloid, a solid calcium metalloid, or a combination thereof; and separating the contaminated water from the solid precipitate to form purified water.

A water treatment plant or facility is disclosed. In an embodiment, the water treatment plant can include one reaction vessel; or two or more reaction vessels, the two or more of the reaction vessels being interconnected. In an embodiment, the water treatment plant includes 1, 2, 3, 4, or 5 reaction vessels. Referring to FIG. 1, in an embodiment, the water treatment plant 100 can be configured to start with a brackish water inlet 142, which may include water from any source. In an embodiment, the water treatment plant can be configured to treat brackish water by a desalination process 102, which separates the impure water into clean fresh water 144 and a brine or contaminated water 132. In another embodiment, the water treatment plant does not include a desalination process and starts with a brine or contaminated water 132. In an embodiment, the water treatment plant is connected in line with a desalination plant.

In an embodiment, the water treatment plant can be configured to pump contaminated water into a first reaction vessel 104 or first tank. In an embodiment, the water treatment plant can be configured to add at least one sulfur-containing, metal-decreasing agent 114, which includes $CH_4N_2S$, $C_2H_5NS$, NaHS, KHS, $H_2S$, or a combination thereof, to the contaminated water to form a first solid precipitate 124, which can include metal sulfides. In an embodiment, the water treatment plant can be configured to pump the water through a first filter 134 to remove the first solid precipitate as the contaminated water is pumped or passed into the second reaction vessel 106. In another embodiment, the metal sulfide precipitates are not removed from the contaminated water and flow in the solution to be used as precipitate seeds for further stages. In an embodiment, the interim filter 134 is optional.

In an embodiment, the plant is configured to add at least one iron (III)-containing, metalloid-decreasing agent and/or add at least one calcium-containing, metalloid-decreasing agent 116, which includes $Fe_2(SO_4)_3$, $FeCl_3$, ammonium iron(III) sulfate, or a combination thereof, to the contaminated water to form a second solid precipitate 126, which includes solid iron metalloids. In an embodiment, the water treatment plant can be configured to pump the water through a second filter 136 to remove the second solid precipitate as the contaminated water is pumped or passed into a third reaction vessel 108. In another embodiment, the iron (III) metalloid precipitates are not removed from the contaminated water and flow in the solution to be used as precipitate seeds for further stages. In an embodiment, the interim filter 136 is optional. In an embodiment, the water treatment plant can be configured to add a hardness decreasing agent 118 to the contaminated water, wherein the hardness decreasing agent includes a sulfate, a carbonate, or a combination thereof, to form a third solid precipitate 128, which includes $MgSO_4$, $MgCO_3$, $CaSO_4$, $CaCO_3$, or a combination thereof. In an embodiment, the water treatment plant can be configured to pump the contaminated water through a third filter 138 into a fourth reaction vessel 110. In another embodiment, the hardness-reducing precipitates are not removed from the contaminated water and flow in the solution to be used as precipitate seeds for further stages. In an embodiment, the interim filter 138 is optional. In an embodiment, the water treatment plant can be configured to add a sulfate decreasing agent 120 or a chloride decreasing agent to the contaminated water, wherein at least one of the sulfate decreasing agent and the chloride decreasing agent include a barium containing compound, a bismuth containing compound, or a combination thereof, to form a fourth solid precipitate 130, which includes barium chloride, barium sulfate, bismuth oxychloride, bismuth sulfate, or a combination thereof. In an embodiment, the water treatment plant can be configured to remove the fourth precipitate by filtration through a fourth filter 140 to provide a purified water 146, wherein the purified water may contain a fertilizer, including $NH_2CN$, $NaNO_3$, $KNO_3$, $NH_3NO_3$, or a combination thereof. In another embodiment, only one filter is used at the end of the treatment process to remove all of the precipitates from the contaminated water. In an embodiment, final filter 140 is not optional.

In an embodiment, as depicted in FIG. 1, the water treatment plant can be configured to perform the following steps, in order: adding at least one sulfur-containing, metal-decreasing agent to the contaminated water; adding at least one iron (III)-containing, metalloid-decreasing agent or adding at least one calcium-containing, metalloid-decreasing agent to the contaminated water; and adding a sulfate decreasing agent to the contaminated water, wherein the sulfate decreasing agent includes a barium containing compound, a bismuth containing compound, or a combination thereof; and forming a purified water containing a fertilizer.

Figure 2:
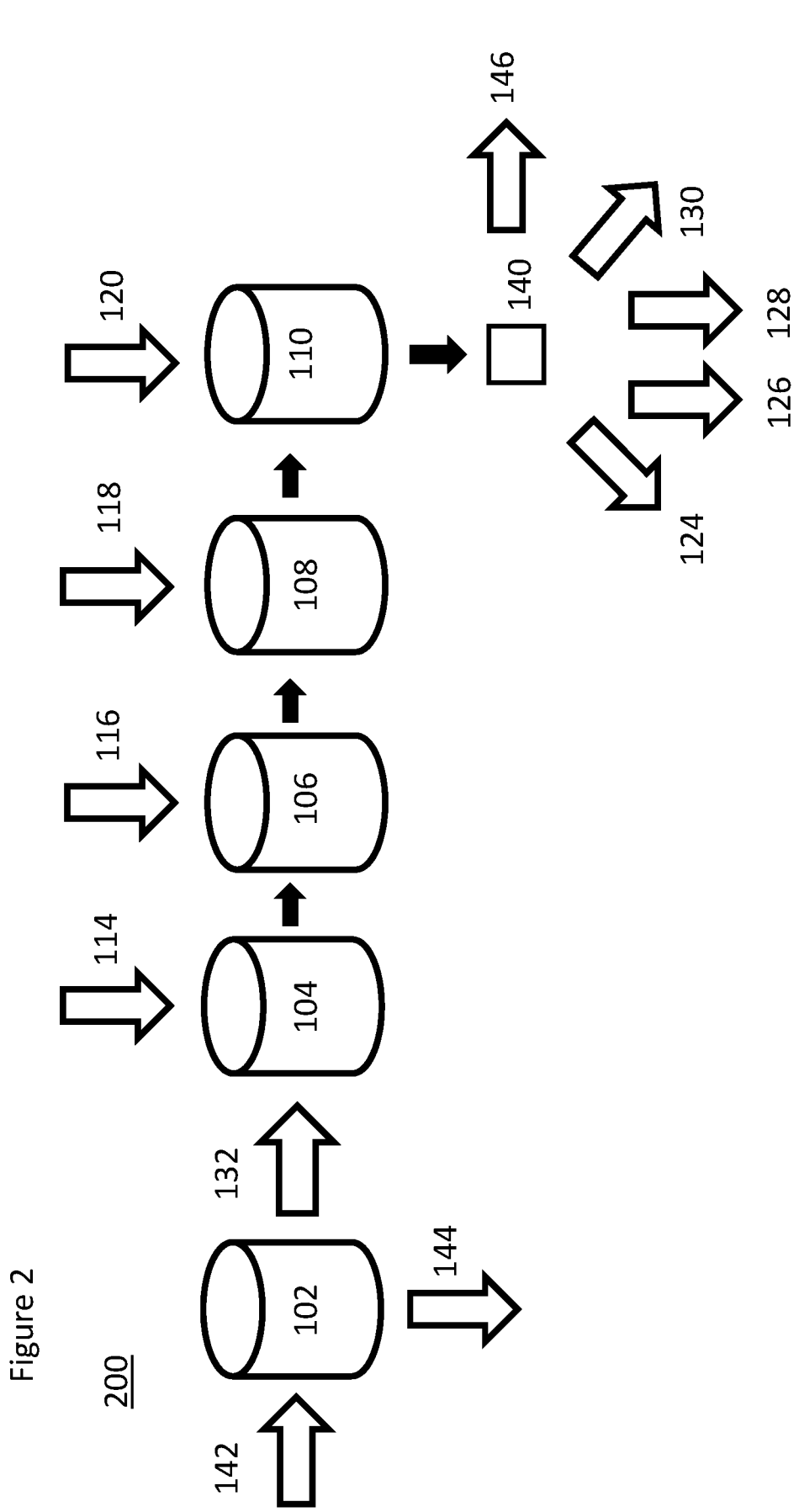
FIG. 2. An embodiment of the water treatment plant for performing an embodiment of the process is depicted in a flow chart.

In an embodiment, the water treatment plant can be configured to include any number of filters to remove solid precipitates, including 1, 2, 3, or 4 filters, because the filters are optional. In an embodiment, any reaction vessel can be connected or disconnected from any other reaction vessel. In an embodiment, the water treatment plant can perform 1, 2, 3, or 4 of the steps using only 1, 2, or 3 reaction vessels. In an embodiment, the water treatment plant is configured to perform all of the reaction steps in a single reaction vessel by adding the each reactant in any sequence or simultaneously. However, it has been found the highest treatment efficiency can be provided by adding each reactant to a separate reaction vessel to form a precipitate that is filtered out after the last step. Referring to FIG. 2, in an embodiment, a water treatment plant 200 is identical to that of FIG. 1, except that the water treatment plant 200 is configured to have only one filter or settling pond 140, which removes all of the precipitates 124, 126, 128, and 130 to provide purified water 146. One benefit of this configuration can be that the precipitates are swept from one reaction vessel to the next reaction vessel, such that the presence of a solid facilitates the formation of the next precipitate to be formed. In this embodiment, the precipitates are removed in the same step.

IN SEVERAL EXEMPLARY EMBODIMENTS

Embodiment 1

A process for treating contaminated water comprising:

adding at least one sulfur-containing, metal-decreasing agent to the contaminated water;

adding at least one iron (III)-containing, metalloid-decreasing agent or at least one calcium-containing, metalloid-decreasing agent to the contaminated water;

forming a solid precipitate from the contaminated water, wherein the solid precipitate includes a solid metal sulfide, a solid iron metalloid, a solid calcium metalloid, or a combination thereof; and separating the contaminated water from the solid precipitate to form purified water.

Embodiment 2

The process of any of embodiments 1 or 3-15, further comprising:

adding a hardness decreasing agent to the contaminated water, wherein the hardness decreasing agent includes a sulfate, a carbonate, or a combination thereof.

Embodiment 3

The process of any of embodiments 1-2 or 4-15, further comprising:

adding a sulfate decreasing agent or a chloride decreasing agent to the contaminated water, wherein at least one of the sulfate decreasing agent and the chloride decreasing agent include a barium containing compound, a bismuth containing compound, or a combination thereof.

Embodiment 4

The process of any of embodiments 1-3 or 5-15, wherein adding at least one iron (III)-containing, metalloid-decreasing agent to the contaminated water occurs during or after adding at least one sulfur-containing, metal-decreasing agent to the contaminated water.

Embodiment 5

The process of any of embodiments 1-4 or 6-15, wherein the at least one sulfur-containing, metal-decreasing agent includes $CH_4N_2S$, $C_2H_5NS$, NaHS, KHS, $H_2S$, or a combination thereof.

Embodiment 6

The process of any of embodiments 1-5 or 7-15, wherein, provided that the contaminated water contains a metal ion selected from the group consisting of cadmium, chromium, copper, lead, mercury, zinc, nickel, any metal ion that forms a solid sulfide precipitate, or a combination thereof, the solid metal sulfide is selected from the group consisting of a cadmium sulfide, a chromium sulfide, a copper sulfide, a lead sulfide, a mercury sulfide, a zinc sulfide, a nickel sulfide, any metal that forms a solid sulfide precipitate, or a combination thereof.

Embodiment 7

The process of any of embodiments 1-6 or 8-15, wherein the iron (III)-containing, metalloid-decreasing agent includes $Fe_2(SO_4)_3$, $FeCl_3$, ammonium iron(III) sulfate, or a combination thereof.

Embodiment 8

The process of any of embodiments 1-7 or 9-15, wherein, provided that the contaminated water contains a metalloid selected from the group consisting of an arsenate, a selenate or a selenite, a borate, a phosphate, or a combination thereof, the solid iron metalloid is selected from the group consisting of an iron arsenate, an iron selenite, an iron borate, a metaborate, an iron phosphate, an iron hydroxide, or a combination thereof.

Embodiment 9

The process of any of embodiments 1-8 or 10-15, wherein the hardness decreasing agent includes $(NH_3)_2SO_4$, $(NH_3)_2CO_3$, $NH_3HCO_3$, $Na_2SO_4$, $Na_2CO_3$, $NaHCO_3$, any metal that forms a solid sulfide precipitate, or a combination thereof; and wherein, provided that the contaminated water contains magnesium, calcium, or a combination thereof, the solid precipitate includes $MgSO_4$, $MgCO_3$, $CaSO_4$, $CaCO_3$, or a combination thereof.

Embodiment 10

The process of any of embodiments 1-9 or 11-15, wherein the sulfate decreasing agent contains $Ba(NO_3)_2$, $BaCl_2$, $Bi(NO_3)_3$, a bismuth oxynitrate, or a combination thereof.

Embodiment 11

The process of any of embodiments 1-10 or 12-15, wherein, provided that the contaminated water contains chloride, sulfate, or a combination thereof, the solid precipitate includes barium chloride, barium sulfate, bismuth oxychloride, bismuth sulfate, or a combination thereof.

Embodiment 12

The process of any of embodiments 1-11 or 13-15, wherein the purified water contains a fertilizer selected from the group consisting of $NH_2CN$, $NaNO_3$, $KNO_3$, $NH_3NO_3$, or a combination thereof.

Embodiment 13

The process of any of embodiments 1-12 or 14-15, further comprising a desalinization step.

Embodiment 14

The process of any of embodiments 1-13 or 15, wherein one or both of the at least one sulfur-containing, metal-decreasing agent or the at least one iron (III)-containing, metalloid-decreasing agent is added as a solid.

Embodiment 15

The process of any of embodiments 1-14, further comprising:
measuring a level of metal ion or metalloid in the contaminated water.

Embodiment 16

A water treatment plant configured to perform the process of any of embodiments 1-15 comprising:
one reaction vessel; or two or more reaction vessels, the two or more of the reaction vessels being interconnected.

Embodiment 17

The water treatment plant of any of embodiments 16 or 18-19, configured to perform the following steps, in order:
adding at least one sulfur-containing, metal-decreasing agent to the contaminated water;
adding at least one iron (III)-containing, metalloid-decreasing agent or adding at least one calcium-containing, metalloid-decreasing agent to the contaminated water; and
adding a sulfate decreasing agent to the contaminated water, wherein the sulfate decreasing agent includes a barium containing compound, a bismuth containing compound, or a combination thereof; and providing a purified water containing a fertilizer.

Embodiment 18

The water treatment plant of any of embodiments 16-17 or 19 comprising:
a water inlet;
a water outlet; and
one or more reaction vessels, wherein at least one of the reaction vessels is connected to the water inlet and at least one of the reaction vessels is connected to the water outlet,
wherein the water treatment plant is configured to add the at least one sulfur-containing, metal-decreasing agent or the at least one iron (III)-containing, metalloid-decreasing agent to at least one of the reaction vessels.

Embodiment 19

The water treatment plant of any of embodiments 16-18, wherein the water treatment plant is configured to add a hardness decreasing agent to the contaminated water, wherein the hardness decreasing agent includes a sulfate, a carbonate, or a combination thereof.

Embodiment 20

A process for treating contaminated water comprising:
adding one or both of at least one sulfur-containing, metal-decreasing agent or at least one iron (III)-containing, metalloid-decreasing agent to the contaminated water;
forming a solid precipitate, wherein the solid precipitate includes a solid metal sulfide, a solid iron metalloid, or a combination thereof and
removing the contaminated water from the solid precipitate to form purified water, wherein the purified water contains a fertilizer.

Embodiment 21

A process for treating contaminated or ion-containing water comprising:
adding at least one sulfur-containing, metal-decreasing agent, at least one iron (III)-containing, metalloid-decreasing agent, a hardness decreasing agent, at least one sulfate reducing agent, and adding a sulfate decreasing agent, or a combination thereof, simultaneously or in any order,
removing ion-contaminants identified or quantified from the contaminated water.

Embodiment 22 the process embodiment of 20, further comprising:
adding at least one sulfur-containing, metal-decreasing agent or at least one iron (III)-containing, metalloid-decreasing agent into one, two or more tanks individually, in sequence, or in a combination.

Embodiment 23

The process embodiment of any of embodiments 21 or 22, further comprising:
transferring fluid from tank to tank, filtering after each tank.

Embodiment 24

The process of any of embodiments 21-23 or 25-26, further comprising:
removing of a solid precipitate before, after, or during any reagent addition steps by filtering or settling.

Embodiment 25

The process of any of embodiments 21-24 or 26, further comprising:
collecting the solid precipitate.

Embodiment 26

The process of any of embodiments 21-25, further comprising:
concentrating or drying the solid precipitate before disposal.

EXAMPLES

Example 1

A water treatment plant was configured according to the design shown in FIG. 1, as follows: The contaminated water flow rate and contaminant concentrations was used to determine the different tank capacities that will be required for each stage of the process. For example, the plant was sized for treating a certain flowrate of contaminated water. To treat 500 gallons per minute ("gpm" or 1,892 liters per minute "LPM") of a contaminated solution, each tank should be capable of holding sufficient solution for a mean estimated residence time determined by how much contaminant must be removed from the water. To determine this, analytical information on the concentration of all of the generic species in the water (total metal ions, total metalloids, total hardness, chloride and sulfate) was determined for an average sample of the water. The water contains 20,000 ppm total dissolved solids (TDS), with most of that chlorides, sulfates and calcium, with undetectable levels of metal ions, and amounts of metalloids above the environmental limits (typically 10 ppm), therefore the plant capable of treating this water had the following tank sizes, referring to FIG. 1:

Metal removal tank 104 (not installed or installed but not used due to lack of metal ions as contaminants).
Metalloid removal tank 106 having an approximately 15,000 gallon (56,781 L) capacity provided 30 minutes of residence time at an average inlet flowrate of 500 gpm (1,892 LPM).
Hardness removal tank 108 having an approximately 15,000 gallon (56,781 L) capacity provided 30 minutes of residence time at an average inlet flowrate of 500 gpm (1,892 LPM).
Chloride and sulfate reducing tank 110 having an approximately 20,000 gallon (75,708 L) capacity provided 40 minutes of residence time at an average inlet flowrate of 500 gpm (1,892 LPM).
Settling pond (thickener) for initial recovery of "treated" water (45' diameter thickener to allow hours of settling/decantation to the slurry.
Filter press 140 with over 100 ft$^2$ of available surface area for treating the slurry from the thickener to recover the rest of the water from the process The reagent scheme that was used for this process was to add a small amount of thiourea ($SC(NH_2)_2$) to the metalloid removal tank with small amounts of calcium oxide (between 0.1 and 1 g/L) and iron(III) sulfate (between 1 and 5 g/L). The exact dosage of each reagent was determined from the analyses of the initial water. Ferric sulfate ($Fe_2(SO_4)_3$) was added to complete the precipitation of iron (III)-selenite, iron (III)-calcium borate, iron (III)-arsenate and iron (III)-hydroxide. The latter can be a beneficial product from adding more than the stoichiometric amount of iron (III) than was needed for the full removal of the selenium and boron from the water. The precipitates were not filtered prior to feeding the hardness removal tank so that the iron precipitates were present to seed the precipitation of the hardness reduction process.

Ammonium sulfate was added in the hardness removal tank to a level commensurate to the hardness of the solution. For this water, from 1-10 g/L was maintained to ensure that the majority of the calcium and magnesium was precipitated and replaced with ammonium ions. The calcium and magnesium sulfate precipitates grew on the existing precipitates from the metalloid removal process.

The solution with all of the precipitates were then allowed to flow into the last vessel (the chloride/sulfate reduction tank). A combination of barium nitrate and bismuth nitrate was added to reduce the chloride and the sulfate concentrations in the water, and it was replaced with the nitrates from the added reagents. The barium sulfate and bismuth oxychloride precipitates were collected in the bulk precipitates now formed in the vessel.

The final solution containing the precipitates was then fed to a thickener. The 45-ft diameter was determined to provide sufficient time for the precipitate to fully settle to the bottom of the thickener, where slow-moving rakes on the bottom gently move the settled material to the center of the cone-shaped bottom for discharge. The thickened precipitate slurry was then pumped to a filter press, to separate the precipitates from the water. Periodically, the filter press was opened to harvest the filtered solids for disposal.

This plant was capable of processing 500 gpm (1,892 LPM) of contaminated water, which is equivalent to remediating the brine output of a 5,000 gpm (7.2 million gallons per day, 27,254,964 L per day) desalination plant.

Example 2

Example 2 is identical to the process and water treatment plant in Example 1, except that metal ions are detected in the contaminated water, and metal removal tank 104 is installed and an equivalent or slight excess of amount of NaHS is added to the metal removal tank to precipitate the metal ions detected.

What is claimed is:

1. A process for treating contaminated water comprising:
adding at least one sulfur-containing, metal-decreasing agent to the contaminated water;
adding at least one calcium-containing, metalloid-decreasing agent to the contaminated water;
forming a solid precipitate from the contaminated water, wherein the solid precipitate includes a solid calcium metalloid;
forming a boron-containing precipitate; and
separating the contaminated water from the solid precipitate to form purified water,
wherein the at least one sulfur-containing, metal-decreasing agent includes $CH_4N_2S$, $C_2H_5NS$, or a combination thereof, and
the at least one calcium-containing, metalloid-decreasing agent includes $CaO_2$ and the boron-containing precipitate includes calcium meta-borate.

2. The process of claim 1, further comprising:
adding a hardness decreasing agent to the contaminated water, wherein the hardness decreasing agent includes a sulfate, a carbonate, or a combination thereof.

3. The process of claim 2, wherein the hardness decreasing agent includes $(NH_3)_2SO_4$, $(NH_3)_2CO_3$, $NH_3HCO_3$, $Na_2SO_4$, $Na_2CO_3$, $NaHCO_3$, any metal that forms a solid sulfide precipitate, or a combination thereof; and
wherein the contaminated water contains magnesium, calcium, or a combination thereof, and the solid precipitate includes $MgSO_4$, $MgCO_3$, $CaSO_4$, $CaCO_3$, or a combination thereof.

4. The process of claim 1, further comprising:
adding a sulfate decreasing agent or a chloride decreasing agent to the contaminated water, wherein at least one of the sulfate decreasing agent and the chloride decreasing agent include a barium containing compound, a bismuth containing compound, or a combination thereof.

5. The process of claim 3, wherein the sulfate decreasing agent contains $Ba(NO_3)_2$, $Bi(NO_3)_3$, a bismuth oxynitrate, or a combination thereof.

6. The process of claim 1, further comprising:
adding at least one iron (III)-containing, metalloid-decreasing agent to the contaminated water occurs during or after adding at least one sulfur-containing, metal-decreasing agent to the contaminated water.

7. The process of claim 6, wherein the iron (III)-containing, metalloid-decreasing agent includes $Fe_2(SO_4)_3$, $FeCl_3$, ammonium iron(III) sulfate, or a combination thereof.

8. The process of claim 1, wherein the at least one sulfur-containing, metal-decreasing agent includes NaHS, KHS, $H_2S$, or a combination thereof.

9. The process of claim 1, wherein the contaminated water contains chloride, sulfate, or a combination thereof, and
the solid precipitate includes barium chloride, barium sulfate, bismuth oxychloride, bismuth sulfate, or a combination thereof.

10. The process of claim 1, wherein the purified water contains a fertilizer selected from the group consisting of $NH_2CN$, $NaNO_3$, $KNO_3$, $NH_3NO_3$, or a combination thereof.

* * * * *